April 2, 1968     T. T. MIKULIN     3,375,624
STRUCTURAL MEMBER Filed Oct. 11, 1965     10 Sheets-Sheet 1

INVENTOR.
TOM T. MIKULIN
BY
Gordon Wood

April 2, 1968 T. T. MIKULIN 3,375,624

STRUCTURAL MEMBER

Filed Oct. 11, 1965 10 Sheets-Sheet 3

INVENTOR.
TOM T. MIKULIN
BY
Gordon Wood

INVENTOR.
TOM T. MIKULIN

April 2, 1968 — T. T. MIKULIN — 3,375,624
STRUCTURAL MEMBER
Filed Oct. 11, 1965 — 10 Sheets-Sheet 6

INVENTOR.
TOM T. MIKULIN
BY
Gordon Wood

April 2, 1968 — T. T. MIKULIN — 3,375,624
STRUCTURAL MEMBER
Filed Oct. 11, 1965 — 10 Sheets-Sheet 7

INVENTOR.
TOM T. MIKULIN.
BY
Gordon Wood.

April 2, 1968     T. T. MIKULIN     3,375,624
STRUCTURAL MEMBER Filed Oct. 11, 1965     10 Sheets-Sheet 8

INVENTOR.
TOM T. MIKULIN
BY

April 2, 1968     T. T. MIKULIN     3,375,624

STRUCTURAL MEMBER

Filed Oct. 11, 1965     10 Sheets-Sheet 9

INVENTOR.
TOM T. MIKULIN
BY
Gordon Wood

April 2, 1968     T. T. MIKULIN     3,375,624
STRUCTURAL MEMBER Filed Oct. 11, 1965     10 Sheets-Sheet 10

INVENTOR.
TOM T. MIKULIN
BY
Gordon Wood

United States Patent Office 3,375,624
Patented Apr. 2, 1968

3,375,624
STRUCTURAL MEMBER
Tom T. Mikulin, Burlingame, Calif., assignor to
Kenneth Millhiser, Hillsborough, Calif.
Filed Oct. 11, 1965, Ser. No. 494,493
20 Claims. (Cl. 52—109)

ABSTRACT OF THE DISCLOSURE

Structural members incorporating, as elements of the structure, lazy tong members. One form of the invention provides a three dimensional beam or arch, another a wheel or reel, and another a structural platform. In the beam or arch structure auxiliary lazy tong structure is employed to reinforce the strength of the member.

---

This invention relates to structural members and more particularly to structural members which incorporate "lazy tong" components so as to permit the structural member to be contracted to a relatively small space and expanded to a relatively large length or area.

One of the main objects of the present invention is the provision of structural members of relatively high strength that can be formed by a relatively small number of light weight components. Although the well known lazy tong type of construction is incorporated in the present invention, numerous advantages are achieved that are not obtainable by a conventional lazy tong structure as it is known in the art at the present time.

Another object of the invention is the provision of a structural member that is three dimensional in form and which achieves certain advantages in simplicity, in use, and in strength which are not obtainable by conventional lazy tong structural members of like nature.

Another object of the invention is the provision of a structural member which is adapted to be expanded from a contracted condition occupying very little space to a greatly enlarged condition either in one dimension or in two dimensions and in which structural member the strength is not impaired as the member is expanded to an extended condition.

Yet another object of the invention is the provision of means for forming a relatively large member such as a reel or wheel from a collapsed structure of relatively small volume.

Another object of the invention is the provision of a three dimensional structural member that may take the form of a curved arch or the like and still retain the advantages of lazy tong construction.

In the prior art there has been suggested the use of a lazy tong type structure in which the member may be extended to an arcuate form rather than the usual straight line form. See, for example, Gustavson Patent No. 1,766,901; Finlayson Patent No. 2,674,252; and Williams Patent No. 3,152,347. However in the prior art represented by these patents the structural members disclosed are two dimesional in form and no suggestion is made as to how the advantages of a three dimensional member may be obtained and still incorporate the features of the well known lazy tong construction.

In certain of the patents of the prior art, spaced apart lazy tong members are adapted to be connected together to effect a final structure that is three dimensional in form, but the three dimensional form does not exist during the extension of the structure and it is necessary to use tie rods and the like to obtain the final three dimensional effect. (See, for example, Williams and Finlayson patents.)

In some instances (Boger 2,767,812; Fulcher 3,053,351; and Ludowici 3,034,765) a three dimensional extendable structure is suggested but the structures of said patents do not lend themselves to the inexpensive manufacture which is possible by the present invention and the inherent advantages and effectiveness of the true lazy tong construction is not employed.

Another object of the present invention is to generally improve structural members employing a lazy tong type of construction.

Other objects and advantages of the present invention will be apparent from the following specification and from the drawings.

FIG. 14 is a fragmentary cross sectional view of a portion of the assembly of FIG. 13 taken in a plane similar to that indicated by lines 14—14 in FIG. 15.

FIG. 15 is a side elevation of the structure of FIG. 12 in completely expanded condition to form a wheel, or one side of a reel or the like.

One embodiment of the invention is shown in FIGS.

Figure 1:
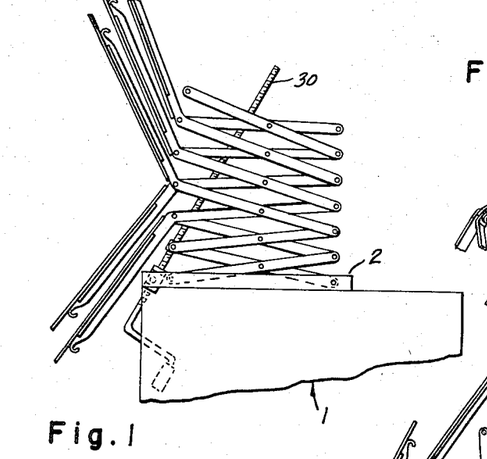
FIG. 1 is a side elevation of one form of the invention comprising a structural member in the form of an arch and in substantially collapsed condition.

1 through 7 wherein is disclosed a structural member which in its expanded condition forms an arch and which in its retracted form occupies a relatively small space as seen in FIG. 1. One end of the structural arch may be supported on a wall or other abutment generally designated 1 to which is secured a pair of parallel guides 2 on which one end of the structure is supported. It will be seen from FIGS. 1 through 7 that the invention comprises a plurality of lazy tong units generally designated 5 and each of which units comprises a pair of spaced opposed lazy tong members 6, 7 respectively, as best seen in FIG. 4. Only the members 6 which comprise one side of the structure are shown in FIGS. 1, 2 and 3 and it will be understood that the members 7 comprising the opposite side are identical.

Each of the members 6 comprises a pair of elongated links 8, 9 which are pivotally connected at a point intermediate their ends by a pivot pin 10. In the type of practical application contemplated by the present invention a relatively large number of units 5 may be serially interconnected to form an arch-like structure but to simplify the disclosure of the invention an arch having only six units is illustrated in the drawings and it will be understood that the actual number of units employed depends on the span desired. This is also true for other forms of the invention.

As best seen in FIG. 4, the pivot pin 10 of each unit extends between the lazy tong members 6, 7 and the links 8, 9 of member 6 are pivotally supported on one end of said pivot pin 10 with a washer 11 interposed betwen said links. Similarly, the links 8, 9 of the opposite lazy tong member 7 are pivotally supported on the opposite end of pin 10.

Figures 2, 6:
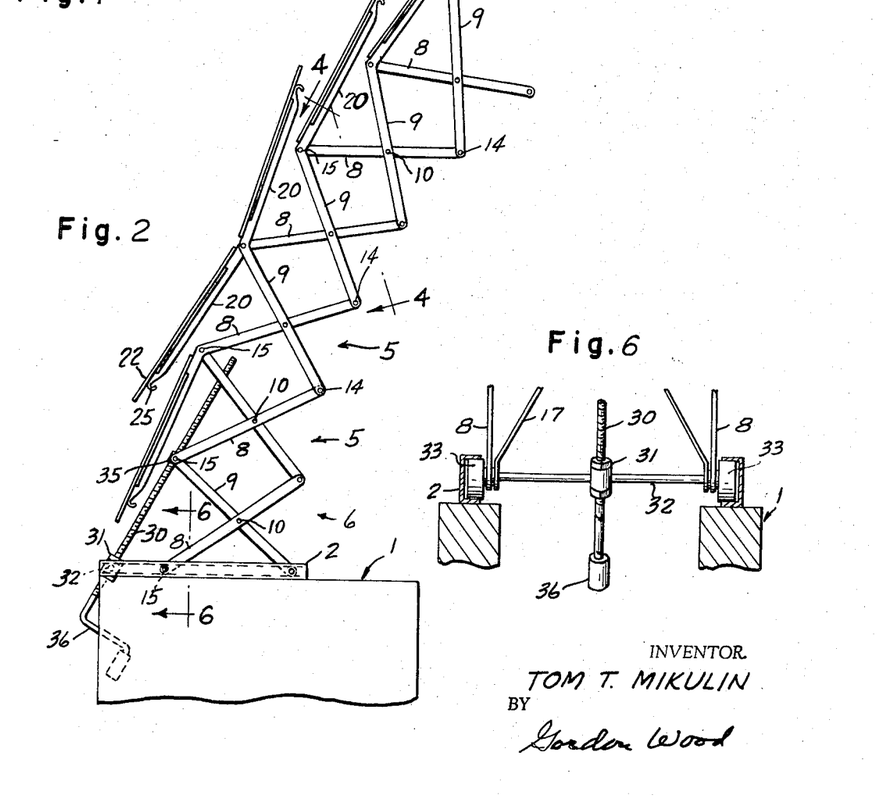
FIG. 2 is a side elevation of the structure of FIG. 1 partially expanded.
FIG. 6 is a section taken in a plane indicated by lines 6—6 of FIG. 2.
Figures 3, 4, 5:
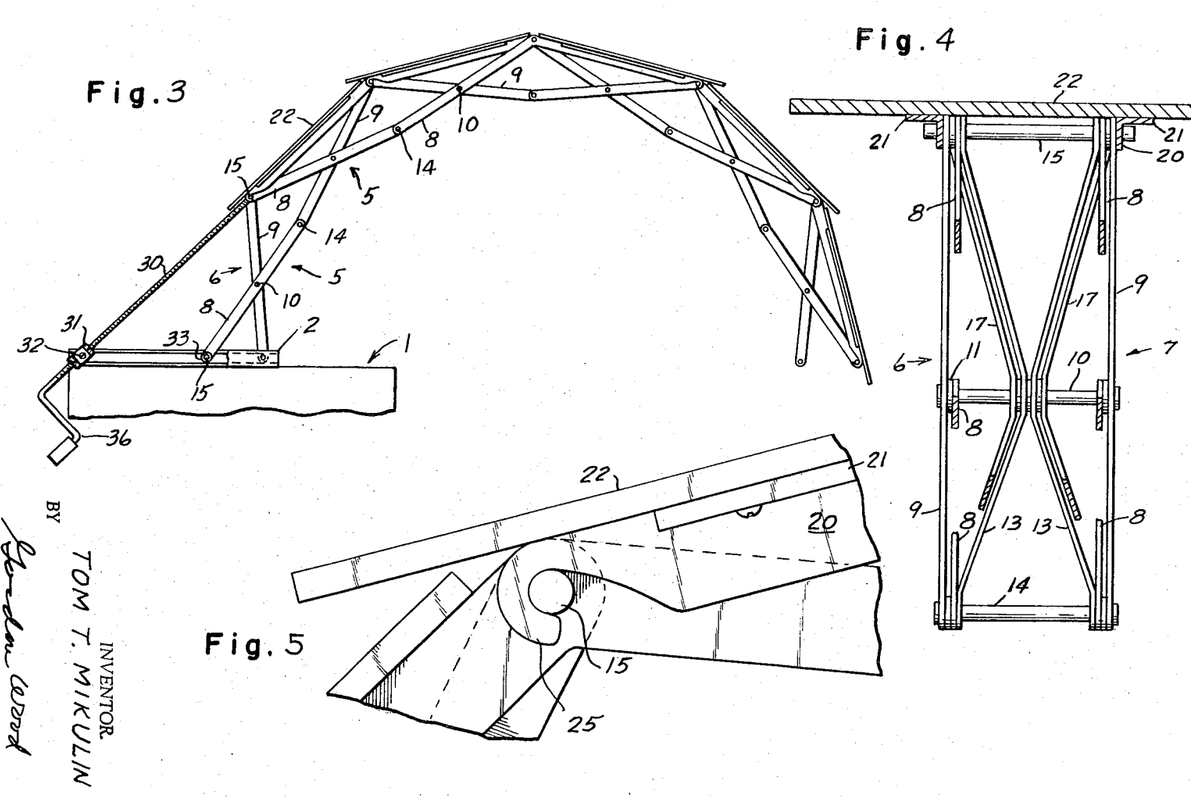
FIG. 3 is a side elevation of the structure of FIG. 1 substantially completely expanded.
FIG. 4 is an enlarged typical cross section as taken in a plane indicated by lines 4—4 of FIG. 2.
FIG. 5 is a greatly enlarged fragmentary side elevation of a typical platform connection in the structure of FIG. 3.
Figure 10:
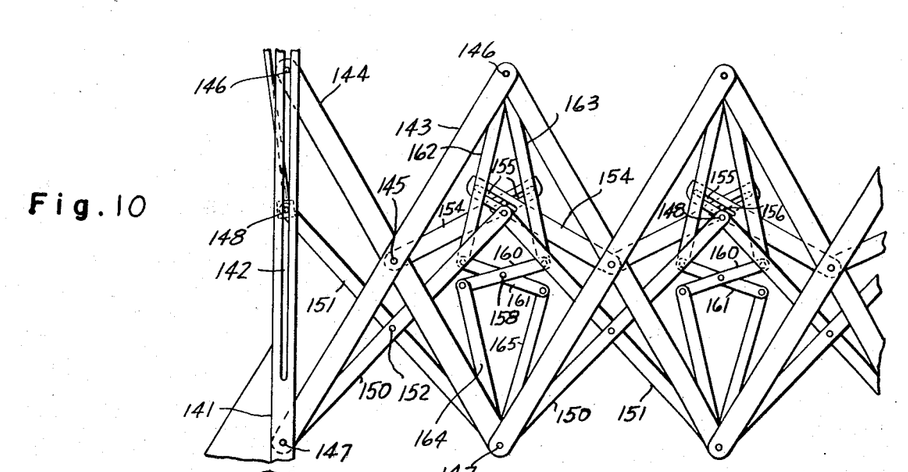
FIG. 10 is a side elevation of a portion of the device of FIG. 8 in partially expanded condition.
Figure 11:
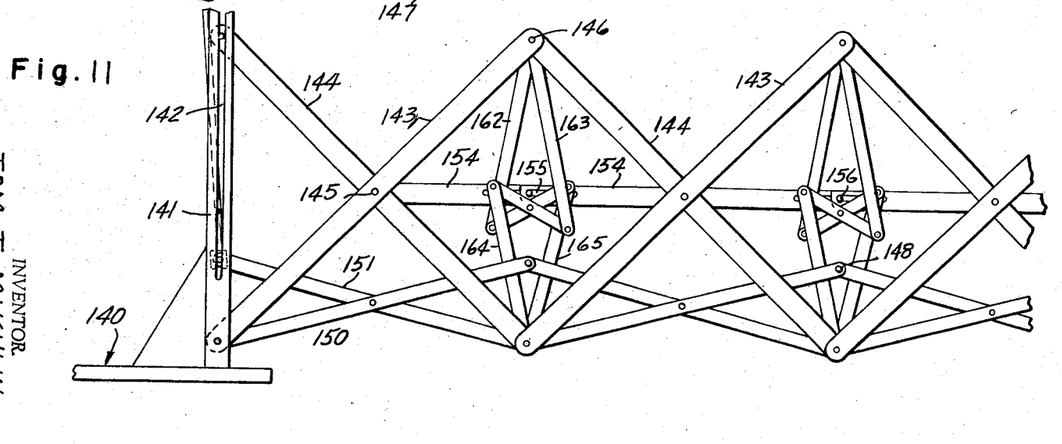
FIG. 11 is a view similar to FIG. 10 but with the structure in substantially completely expanded condition.

It will be apparent from FIGS. 1, 2, and 3 that the amount of curvature of the structure is determined by the position of the pivot pins 10 with respect to the center of the links of the lazy tong members. By moving the pivot pins 10 toward the lower or right hand side of the structure as seen in FIG. 2 the resulting curvature will be as shown. The radius of curvature of the final structure may of course be determined by the amount of offset of the pivot pins from the center of the associated links. When a straight structure is desired (as shown in FIGS. 10, 11) the pivots 10 are at the centers of the links.

Figure 7:
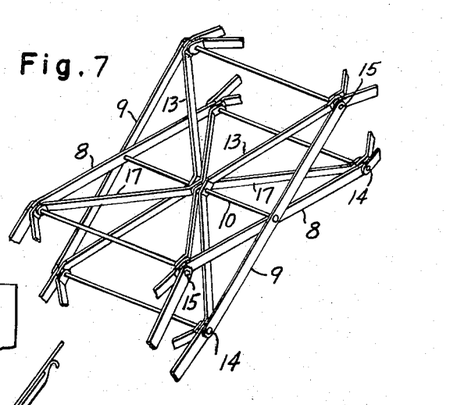
FIG. 7 is a fragmentary perspective of the structure of FIG. 3 showing one lazy tong section only.

An important feature of the present invention is the provision of stiffening means for each lazy tong unit and which stiffening means does not affect the operation of the lazy tong members of each unit in the normal manner. This stiffening is obtained by means of stiffening elements that extend from each end of each link toward the center of the particular unit and which element is pivotally supported on pin 10 adjacent the center of the unit. Thus, as best seen in FIGS. 4 and 7, a stiffening element 13 is associated with each link 9 and is pivoted at one end to the inner connecting pin 14 and at its other end to the outer connecting pin 15. As seen in FIG. 4, the element 13 is bent so as to extend to the center of each unit and is apertured to receive the central pivot pin 10 therethrough. It will be seen from FIG. 7 that each link 8 on each of the opposed members 6, 7 is provided with a stiffening element 17 which in like manner is pivoted at its opposite ends to the connecting pins 14, 15 and at its central portion to the central pin 10.

It will be understood that the presence of the stiffening elements 13, 17 does not affect the operation of the lazy tong structural member in any way but when the member is extended the equivalent of a rigid structural frame member is effected without the necessity of adding additional interconnecting or stiffening means.

The present invention also contemplates the provision of a deck on the structural member which in the case of a roof truss can constitute a covering member or, in the case of a bridge or the like can constitute a support to permit passage of persons or vehicles thereover.

Such a deck may be formed by providing an integral extension 20 in continuation of each link 9 on the remote end of the structure and in continuation of each link 8 on the proximal end of the structure. Fixedly secured to each of the extensions 20 as by flanges 21 is a deck element 22. The unsupported end of each extension 20 is formed with a hook-like end 25 which, when the member is fully extended, engages the pivot pin 15 of the adjacent corresponding link as best seen in FIG. 5. The interconnection between the hook end 25 and the associated pivot pin not only serves to limit the expansion of the member to a predetermined span but also provides additional stiffening for the assembly.

Although the present invention contemplates the manual actuation of the extensible structure, it will be understood that in large installations power means is required to effect extension and contraction of the member. However, a simplified form of manually actuatable means is shown in the drawings and comprises a lead screw 30 which is rotatably supported and held against axial movement by bearing 31. Bearing 31 may be pivotally supported on shaft 32 extending between guides 2. The opposite ends of the outer pivot pin 15 that is adjacent support 1 is pivotally supported at its ends in said guides 2 by a roller 33 and the adjacent pin 15 is provided with a threaded block 35 (FIG. 2) receiving the lead screw 30 therethrough. It will be apparent from FIGS. 1, 2 and 3 that upon rotation of lead screw 30 by means of crank 36 in one direction the member will expand to the extended condition of FIG. 3 and upon rotation of the lead screw in the opposite direction the member will be contracted to the condition shown in FIG. 1.

In FIGS. 12 through 15 there is illustrated another form of the invention in which a wheel or cable reel is formed with lazy tong elements.

Figures 14, 15:
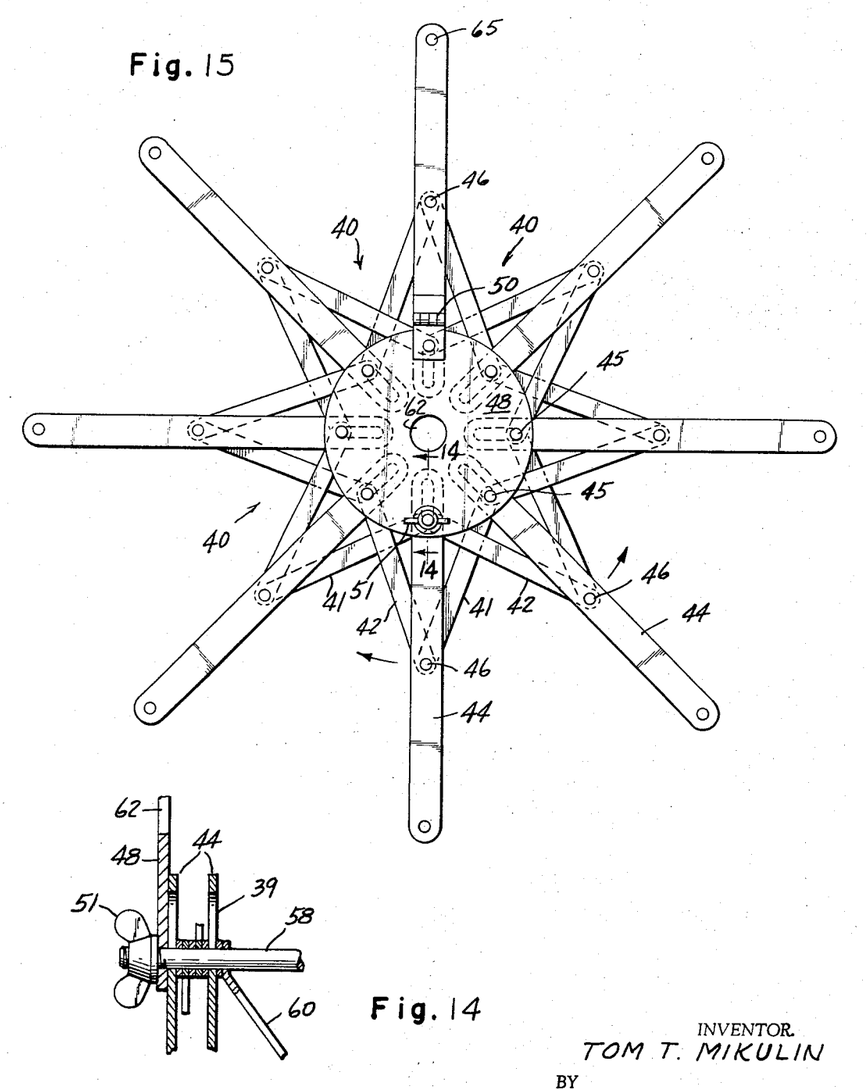
Figure 16:
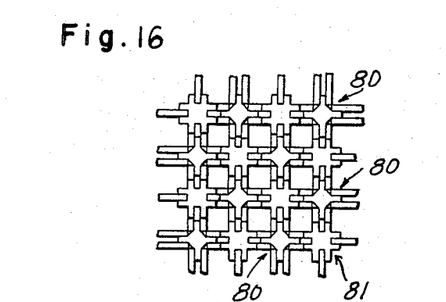
FIG. 16 is a top plan view of a modified form of the invention in collapsed condition.
Figure 17:
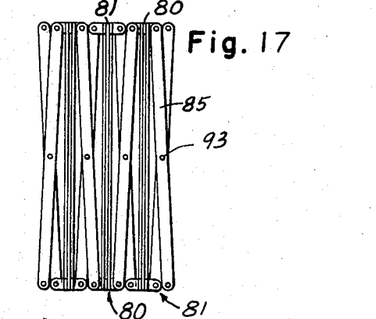
FIG. 17 is a side elevation of the device of FIG. 16.

Referring first to FIG. 15, it will be seen that the expanded structure is formed by a plurality of interconnected lazy tong members generally designated 40 each of which members includes links 41, 42 pivotally connected at their ends to radially extending ribs 44 by means of inner and outer pivots 45, 46 respectively. The inner pivots 45 are slidably disposed in elongated slots 39 formed in ribs 44.

Figure 12:
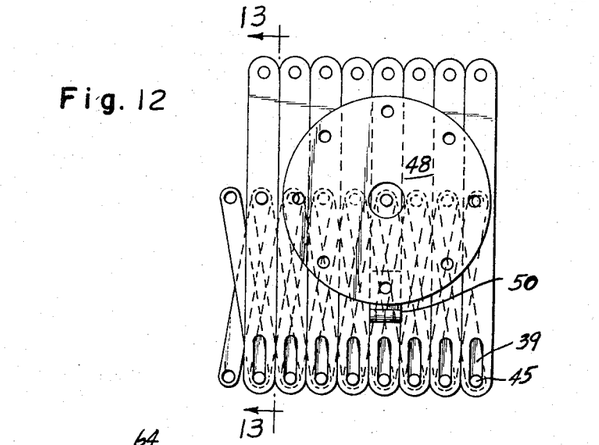
FIG. 12 is a side elevation of a modified form of the invention that comprises a circular structure member adapted for use in a reel, wheel or like structural member.

When the collapsed structure of FIG. 12 is fully expanded to form the circular shape of FIG. 15 the inner ends of radial ribs 44 may be fixedly secured together by means of a circular plate 48 which is apertured to receive therethrough pivot pins 45 projecting outwardly from the inner ends of radial ribs 44. For convenience, plate 48 may be hingedly connected as at 50 to one of the ribs 44 so that when the structure is fully expanded the plate may be swung from the position of FIG. 12 to the position of FIG. 15. Also one of the pins 45 may be threaded to receive a wing nut 51 to prevent disassembly.

In order to achieve maximum ragidity with a minimum of material it is preferable that the number of lazy tong members 40 be such that when the structure of FIGS. 12 to 15 is in its fully open position as seen in FIG. 15 corresponding pairs of ribs 44 are in alignment.

If it is desired to employ the above described structure for a reel it is merely necessary to extend the pins 45 between two opposite identical sides of the type described above and in the form of rods 58 (FIG. 13) to provide a series of supporting elements arranged in a circular row about the center of plate 48. In the case of a wide reel the pins 46 may be extended between the opposite sides in the form of rods 59 and, in the case of a reel having relatively large axial extent additional pivoted stiffeners 60, 61 may extend diagonally from the center of each rod 58 to points adjacent the ends of rod 59 as best seen in FIG. 13.

If the reel is to be supported on a journal the opposite plates 48 may be apertured as at 62 to receive a shaft therethrough for rotatably supporting the assembly. On the other hand, if the structure is to be rolled on a supporting surface, a suitable collapsible peripheral member (not shown) may be secured to the outer ends of ribs 44. The arrows in FIG. 15 indicate the direction of swing of the ribs for collapsing the structure after the wing nut 51 and the adjacent pivot 46 have been disconnected.

Figure 13:
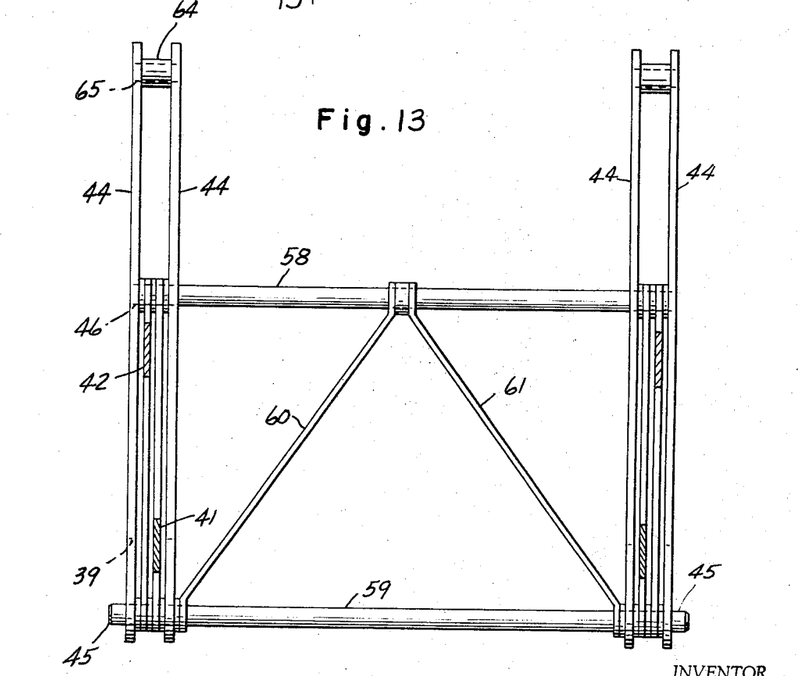
FIG. 13 is a greatly enlarged cross section of an assembly that includes two opposite sides each similar to the structure of FIG. 12.

Preferably the radial ribs 44 are arranged in pairs as best seen in FIG. 13 and spacers 64 and pins 65 are interposed between the outer ends of each pair so that the above described linkages may be positioned between each pair of ribs.

The structure shown in FIGS. 16 to 20 is one that is adapted for use as a supporting platform of relatively large area compared to the area or volume occupied by the device in its collapsed condition.

Figure 18:
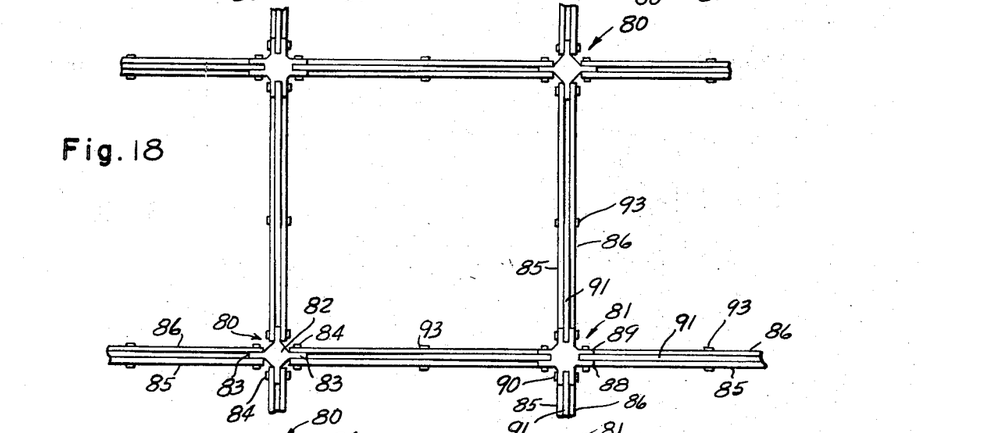
FIG. 18 is a fragmentary top plan view of a portion of the device of FIG. 16 in expanded condition.
Figure 19:
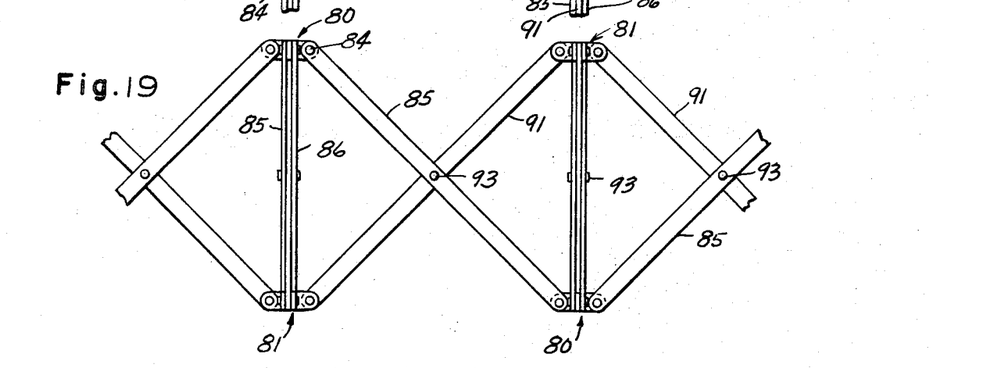
FIG. 19 is a fragmentary side elevation of the structure of FIG. 18.
Figure 20:
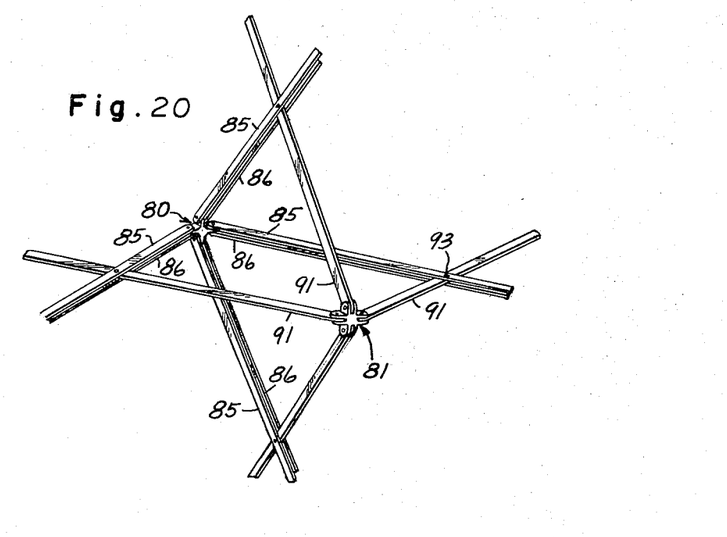
FIG. 20 is a fragmentary perspective of the structure of FIGS. 18, 19.

The extensible platform structure comprises a plurality of vertically spaced joint members 80, 81. As best seen in FIG. 18, the upper joint members 80, 81 are arranged in alternating relationship and the lower joint members 80, 81 are also arranged in alternating relationship. Joint member 80 comprises a central body portion 82 and four equally spaced radially outwardly extending flanges 83. To each of the flanges 83 there is pivotally secured by a pivot 84 the corresponding ends of a pair of links 85, 86.

Each of the joint members 81 is similar to the above described joint member 80 except that the joint member 81 is provided with pairs of radially extending flanges 88, 89 between which is pivotally secured by means of pivot 90 a link 91. It will be seen from FIGS. 18, 19 that the pairs of links 85, 86 and the single links 91 are pivotally connected at their centers by means of pivot 93 so that the structure may be expanded from the contracted condition shown in FIGS. 16, 17 to the expanded condition shown in FIGS. 18, 19. In the expanded condition shown in FIGS. 18, 19 the joints 80, 81 that are on the upper side of the structure provide points in a horizontally extending plane on which a suitable supporting surface such as plywood or planks may be provided to effect a platform. Also this three dimensional structure may be employed as a roof truss or any like structural member having exceptional strength and resistance to deflection.

Figures 21, 22:
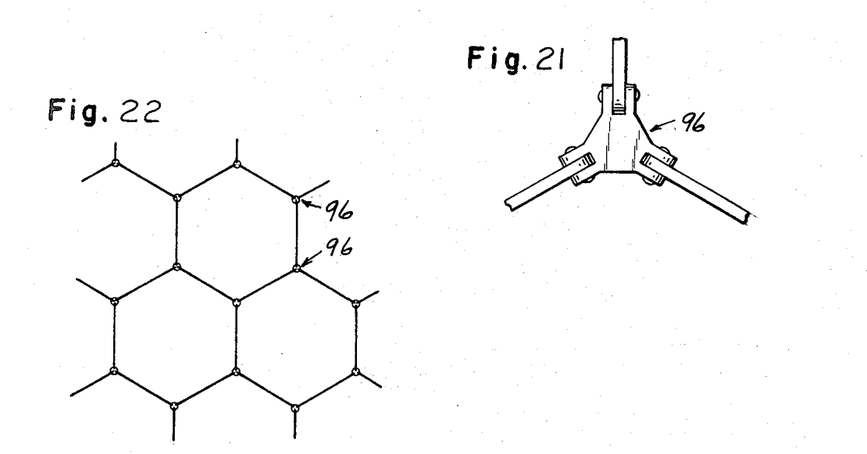
FIG. 21 is a fragmentary top plan view of a connecting joint in a modified form of the invention.
FIG. 22 is a schematic top plan view of a platform incorporating the connecting joint of FIG. 21.
Figure 23:
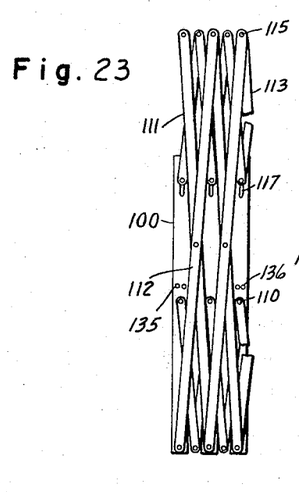
FIG. 23 is a side elevation of a portion of a bridge structure incorporating one form of the present invention.

A modified form of the above described structure is shown in FIGS. 21, 22. In this case the joint member 96 may be provided with lugs or pairs of lugs spaced apart 120° so that instead of four lazy tong members being connected to each joint member there are only three. It will be understood that the structure of FIG. 21 contemplates a similar joint being provided with only one flange at the same locations where the pairs of flanges are indicated in FIG. 21. FIG. 22 shows schematically the general arrangement of the platform which results from the structure of FIG. 21. FIG. 22 should thus be compared with FIG. 18 showing the structure that is described in detail.

The form of the invention shown in FIGS. 8–11 is similar to that disclosed in FIGS. 1–7 in that a load carrying structural member is effected. Although it will be apparent that the structure to be described could, by following the teachings of FIGS. 1–7, be modified to effect a curved arch, the structure of FIGS. 8–11 will be described on the assumption that a straight bridge-like support is to be provided.

Figure 8:
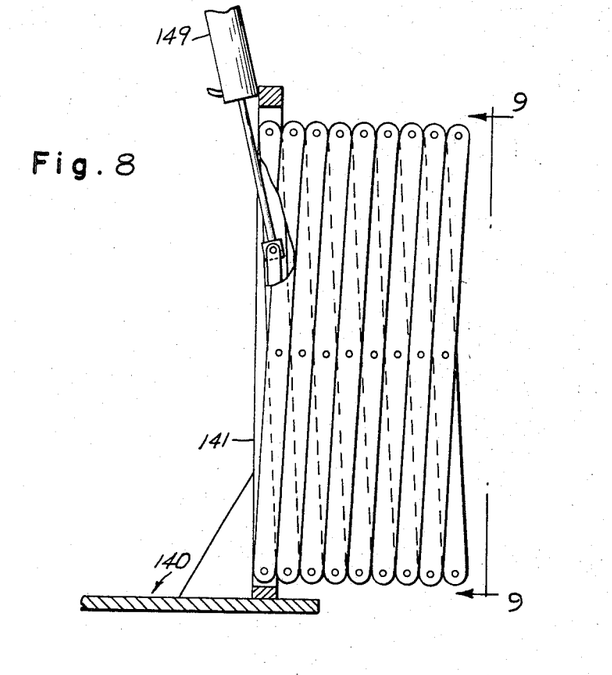
FIG. 8 is a side elevation of a modified form of structural member in a collapsed condition.

In FIGS. 8, 10, 11 a suitable support generally designated 140 is shown to which one end of the structure is secured. A pair of vertically extending posts 141 are fixed at their lower ends to support 140 and said posts are longitudinally slotted as at 142 to receive two of the pivots that are incorporated in the lazy tong structure at each side of the structural member.

Each main lazy tong member comprises a pair of elongated links 143, 144 pivotally connected intermediate their ends on pivot 145. The upper row of pivots 146 of said links 143, 144 pivotally connect the upper ends of said links except that the pivot 146 at the proximal end of the structure is slidably disposed in slot 142 of post 141 for vertical movement therein. The pivots 147 form the lower row of lazy tong pivots and the proximal pivot 147 is pivoted to post 141.

By the present invention stiffening of the expanded structure is effected by an auxiliary lazy tong mechanism which comprises a plurality of serially connected pairs of links 150, 151 pivotally connected intermediate their ends by pivots 152.

Figure 9:
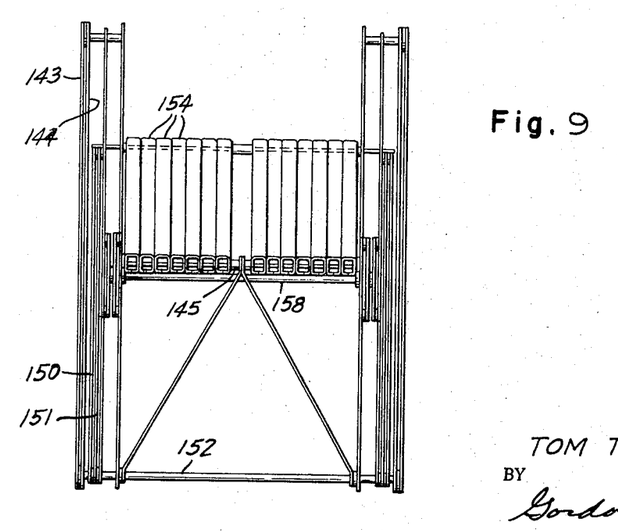
FIG. 9 is an end elevation of the structure of FIG. 8.

The outer row of pivots for links 150, 151 are coaxial with the corresponding pivots for links 143, 144. Preferably a rod 152 extends between the two identical lateral sides of the structure and is formed at its end to provide said pivots (FIG. 9).

The inner row of pivots 148 for links 150, 151 terminates in a pivot 148 slidably disposed in slot 142.

The load supporting platform of the present embodiment is formed by a plurality of elongated load supporting elements 154 which are pivotally supported at one of their corresponding ends of pivot 145 which consists of a rod extending between the identical lateral sides of the structure. The elements 154 are arranged in alternating relation along the length of rod 145 so that half of the elements 154 extend toward one end of the structure and the other half toward the other end.

The ends of elements 154 that are remote from rod 145 are provided with slots 155 through which extends a rod 156. Rod 156 extends beyond the opposite sides of the load supporting platform and is adapted to be engaged by the upper ends of links 150, 151 as the latter move upwardly when the structure is being retracted from its extended position. From FIGS. 10, 11 it will be seen that the platform elements 154 are in a horizontal position when the structure is fully extended and remain in a horizontal position during a considerable amount of retraction toward the fully contracted position of FIG. 8. However before movement of elements 154 becomes limited by the length of slots 155 the upper ends of links 150, 151 engage rod 156 and urge it upwardly so that it carries the adjacent ends of elements 154 up to the completely retracted position of FIG. 8.

Since one of the corresponding ends of elements 154 are supported on rod 145 it is important to support the other corresponding ends on a support that maintains the same elevation relative to the rods 145. This is accomplished by a "floating" support consisting of a rod 158 that extends between the opposite sides of the structure and which is pivotally connected at the centers of a pair of relatively short links 160, 161. One pair of corresponding ends of links 160, 161 are pivotally connected to the lower ends of a pair of relatively long links 162, 163 which in turn are pivotally supported at their upper ends on the adjacent pivot 146. The other pair of corresponding ends are pivotally connected to the upper ends of another pair of relatively long links 164, 165 which are pivotally connected at their lower ends to the adjacent pivot 147.

By reference to FIGS. 10, 11 it will be seen that, regardless of the length of the structure, rod 158 always maintains the same position relative to rod 145. Thus rod 158 constitutes a "floating" support maintaining the load carrying platform horizontal through a relatively large range of effective lengths of the structure.

In FIG. 8 a hydraulic cylinder 149 is connected to the proximal inner pivot 148 of the auxiliary lazy tong mechanism which consists of the serially connected links 150, 151. By applying power to the auxiliary lazy tong mechanism less power is required and it is easier to expand and contract the structure.

It will be understood that the provision of links 150, 151 as shown results in the strength of the structure being increased as the effective length increases. In other words, links 150, 151 become tension members resisting bending flexure of the structure when the latter is supported at its ends.

The present invention also contemplates the duplication of an auxiliary lazy tong mechanism at the top of the structure as well as at the bottom as indicated in FIGS. 10, 11. In such a case the second auxiliary lazy tong member would be connected to the upper pivots 146 and would constitute a compression member in the case of a simple beam arrangement.

Another modified form of the invention which is similar in some respects to that disclosed in FIGS. 8 through 11 is illustrated in FIGS. 23 through 27. In this case the arrangement is again such that the platform elements which cooperate to provide a support for persons or vehicles is incorporated into the lazy tong mechanism so that there is no necessity for providing means for connecting separately mounted platform elements.

Figure 24:
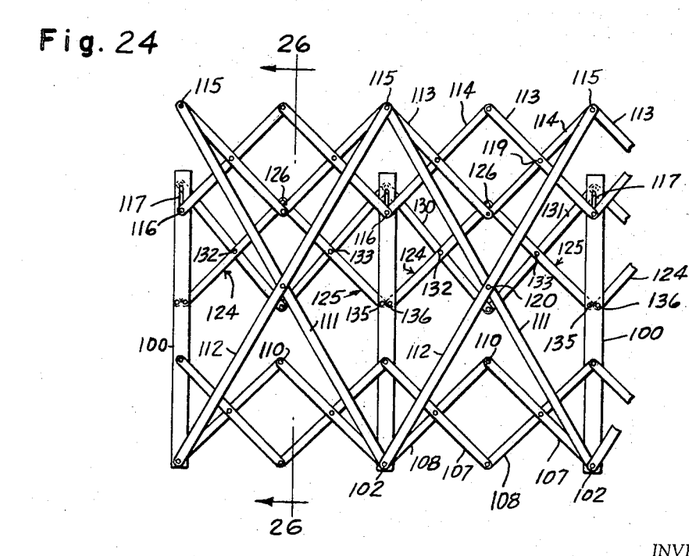
FIG. 24 is a side elevation of the structure of FIG. 23 in partially expanded condition.
Figure 25:
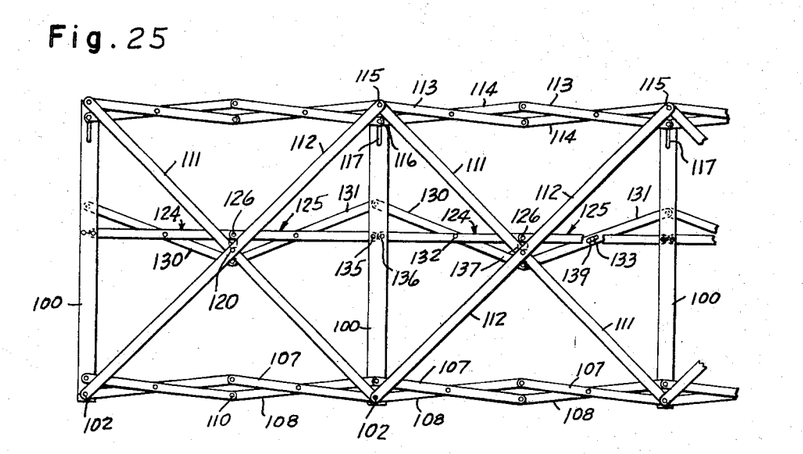
FIG. 25 is a view similar to FIG. 24 showing the structure fully expanded.
Figure 26:
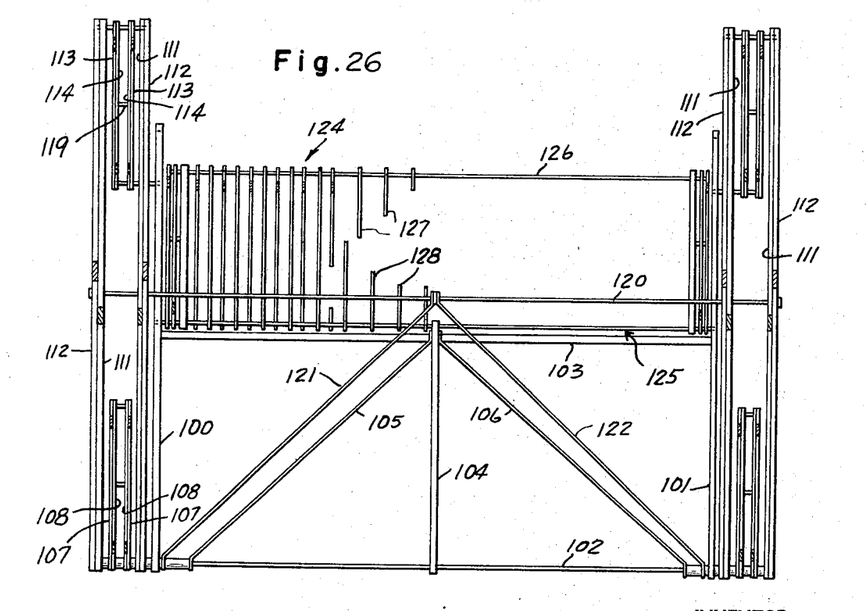
FIG. 26 is a fragmentary end elevation of the structure of FIG. 24.
Figure 27:
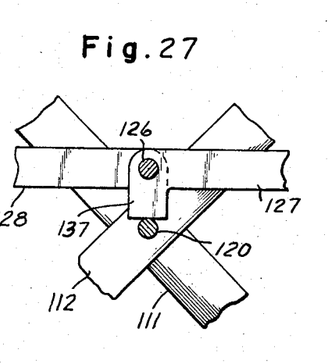
FIG. 27 is a greatly enlarged cross section showing the central connection of each lazy tong section.

The structure of FIGS. 23 through 27 also includes laterally spaced apart lazy tong mechanisms. The mechanism on one side includes a plurality of longitudinally spaced apart vertically extending posts 100 and, on the other side, similar posts 101 (FIG. 26).

Connecting each pair of posts 100 and 101 is a shaft 102 extending between the lower ends of said posts. Spaced upwardly from shaft 102 is a cross piece 103 which is adapted to support the platform elements to be described later on. In order to stiffen the working platform for the heavy loading it is adapted to resist a vertically extending stiffener 104 is secured at its opposite ends to the cross piece 103 and the shaft 102. Additional diagonal stiffeners 105, 106 may also be provided as shown in FIG. 26 for the same purpose.

The lower ends of posts 100, 101 are tied together by a plurality of lazy tong members consisting of links 107, 108 as best seen in FIGS. 24, 25. Alternating outer pivots of lazy tong links 107, 108 are pivotally connected to shaft 102 or an extension thereof and the inner pivots 110 are free for vertical movement as the structure is expanded and contracted. At this point it is pertinent to note that in FIGS. 23 to 26 the length of the structure includes only three pairs of vertically extending posts 100 and 101 and it will be understood that a longer structure may be effected simply by duplicating the structure shown.

The links 107, 108 constitute a stiffening means for the main lazy tong structure consisting of relatively long links 111 and 112.

The stiffening of the upper end of the structure is achieved by lazy tong links 113, 114 which are analogous in function to the previously described links 107, 108. The lower ends of links 111, 112 are pivotally connected to the alternate outer pivots of the lower stiffening lazy tong member at shafts 102 and, although the upper ends of links 111, 112 are unconnected to the posts 100, 101 they are pivotally connected to alternate outer pivots 115 of the links 113, 114. The inner pivots of links 113, 114 are pivotally connected in alternating arrangement to the upper ends of posts 100, 101 by means of pivots 116 which are slidably supported in slots 117 formed in posts 100, 101.

As best seen in FIG. 26, the above described lazy tong elements are preferably duplicated on each side of the structure so as to give a balanced arrangement. Thus, two links 113 and two links 114 are similarly arranged in spaced apart relation and pivoted on pin 119. In like manner two links 111 and two links 112 are arranged in spaced apart relation on opposite sides of the links 113 and 114 and are pivotally supported intermediate their ends on shaft 120. Shaft 120 extends across the width of the structure and supports the corresponding links 111, 112 on the opposite side thereof. For the purpose of stiffening the central portion of shaft 120 there may be provided a pair of diagonal struts 121, 122 pivotally supported at their upper ends on shaft 120 and extending downwardly and outwardly and pivotally supported at their lower ends on the previously described shaft 102. Since links 111 and 112 are also pivotally supported on shafts 102 it will be apparent that said links and said shaft 120 together with struts 121, 122 swing as a unit as the structure is expanded and contracted.

The support which is adapted to take the weight of persons or vehicles consists of a plurality of platform elements which are swingably connected together to be expanded and contracted with the above described structure and which support sections are incorporated in a lazy tong structure of their own. Between each pair of posts 100 and 101 there are provided a pair of platform sections generally designated 124, 125 (FIG. 24) and which platform sections are pivotally connected together as indicated at 126 in FIG. 24. Although the actual construction of the weight receiving platform sections may be of any desired design, platform section 124 is shown in FIG. 26 as comprising a plurality of spaced apart flat bars 127 and platform sections 125 are composed of a plurality of spaced apart flat bars 128. These flat bars 127, 128 are pivotally supported at their adjacent ends on shaft 126 which constitutes the above mentioned pivot. It will be seen that by arranging bars 127 and 128 in alternating arrangement the above described pivotal connection can be effected.

The platform sections 124, 125 cooperate with links 130 and 131 respectively to provide a lazy tong arrangement in which the platform sections 124, 125 are operative parts. Thus link 130 is pivotally connected intermediate its ends to platform section 124 by means of a pivot indicated at 132 and platform section 125 is similarly connected to link 131 by means of pivot 133.

Platform section 125 is pivotally supported at its end opposite pivot 126 on posts 100 and 101 by means of pivot 135 and the corresponding end of platform section 124 is supported on posts 100, 101 by means of pivot 136. From a consideration of FIGS. 24 and 25 it will be seen that the effective length of each link 131 is greater than the extent of the associated platform section 125 between its pivots 126, 135. The same is true of link 130 with relation to platform section 124. The result of this structure is that when the platform sections 124, 125 are in alignment to form a load supporting deck as shown in FIG. 25 the links 130, 131 are slantingly disposed relative to said deck. This necessitates the provision of a slot 139 in links 130, 131 to permit the pivoted ends of the platform sections to be hingedly supported and still at the same time be in alignment to form a planar deck in the extended position of FIG. 25.

The shaft 120 on which the long links 111, 112 are swingably supported at their centers constitutes a support for the adjacent ends of platform sections 124, 125. Since the shaft 120 is preferably interposed between the opposite pivot points of the lazy tong member comprising links 130, 131 and platform sections 124, 125 a short extension 137 (FIG. 27) is provided at the adjacent ends of the flat bars 127, 128 on the platform sections 124, 125 so that said extensions rest on the shaft 120 when the platform sections are in their horizontal working position shown in FIG. 25.

It will be understood that the above described structure may be formed with a large number of pairs of posts 100, 101 so as to form a relatively long structure in its expanded condition. It will also be understood that by virtue of the provision of the upper and lower sets of lazy tong members consisting of links 113, 114 and 107, 108 the strength of the resultant structure is considerably enhanced; in fact the resulting structure is closely analogous to the type of structure that might be formed of links welded together to withstand conventional loads such as in a bridge. In other words, although the conventional lazy tong type of extension member is the basis for the above described structure the provision of such lazy tong members for use as stiffeners, as well as for members to effect the extension, makes the structure suitable for heavy duty loading such as in platforms, stagings, bridges and the like.

With respect to the various embodiments of the invention described above it will be understood that simplified forms have been disclosed to emphasize the salient features of the invention. As noted above, various types of power means may be employed to extend and contract the structures. However, the present invention is concerned primarily with the structure per se.

It will also be apparent that the structures of FIGS. 3, 11 and 25 may be duplicated and extended in opposite directions from an operating point to double the effective span. Also, two structures may be extended from widely spaced points to a point of connection intermediate such spaced points.

The very specific description given above of the preferred forms of the invention should not be taken as restrictive of the invention since various modifications in design will occur to those skilled in the art without departing from the scope of the following claims.

I claim:

1. A structural member adapted to be extended and contracted in length comprising:
   a plurality of serially connected three dimensional lazy tong units,
   each of said units comprising a pair of spaced opposed lazy tong members with each of said members including a pair of links pivotally connected by an intermediate pivot at a point intermediate the ends thereof, with said intermediate pivots of said pairs of members coaxial,
   stiffening elements extending inwardly of said units from points adjacent the ends of said links toward the common axis of said intermediate pivots,
   means connecting said elements adjacent the centroid of each unit whereby said stiffening elements form diagonal struts for each unit.

2. A structural member according to claim 1 wherein said intermediate pivots are closer to one side than the other of two of the spaced top and bottom sides of said member whereby the latter is nonlinear when extended.

3. A structural member according to claim 1 wherein each of said units is provided with a rigid load supporting element with the load supporting elements of said units combining to provide a load supporting deck on said member when the latter is extended.

4. A structural member according to claim 3 wherein said load supporting elements are fixed to integral extensions of certain of said links.

5. A collapsible structural support comprising:
   a plurality of lazy tong members,
   each of said members comprising a pair of links pivotally connected at a point intermediate the ends thereof,
   means pivotally connecting together the ends of the links of at least three of said lazy tong members with the latter extending outwardly from said means in different directions substantially within a common plane.

6. A support according to claim 5 wherein three members are connected to said means with the planes of said members equally spaced apart about said means.

7. A support according to claim 5 wherein four members are connected to said means with the planes of said members equally spaced apart.

8. In a lazy tong structure that includes a plurality of serially connected lazy tong members wherein each member includes a pair of links pivotally connected by an intermediate pivot at a point intermediate the ends of said pair, and wherein corresponding ends of the links of one member are pivotally connected by connecting pivots to the corresponding ends of the links of an adjacent member to provide two rows of connecting pivots along opposite side edges of said structure, the improvement that comprises:
   a second plurality of serially connected lazy tong members having links of shorter length than the links of said first mentioned members,
   at least some of the connecting pivots along one side edge of said second plurality of members being coaxial with the pivots along a corresponding one side edge of said first mentioned plurality,
   whereby the links of said second plurality of members move toward a position in alignment with the row of pivots of said corresponding one side as said structure is extended in length.

9. A structure according to claim 8 wherein a third plurality of serially connected lazy tong members are disposed along the other side of said first mentioned plurality.

10. A structure according to claim 8 wherein a vertically disposed post is provided at each end of each of said first mentioned lazy tong members and pivotally connected to the pivots along said one side thereof,
   means cooperatively associated with said posts forming a load carrying deck.

11. In a lazy tong structure:
   a plurality of serially connected lazy tong units,
   each of said units comprising a pair of laterally spaced vertically disposed lazy tong members with each of said members including a pair of links pivotally connected by an intermediate pivot at a point intermediate the ends thereof, the upper ends of said links being pivotally connected to form a horizontally extending row of upper pivots and the lower ends of said links being pivotally connected to form a horizontally extending row of lower pivots,
   vertically extending posts pivotally connected to said lower pivots,
   load supporting members swingably supported on said posts and adapted to be swung from an upwardly slanting position to a horizontally extending aligned position upon movement of said structure from a contracted to an extended position.

12. A structure according to claim 11 wherein links are cooperatively associated with said load supporting members to form second lazy tong units between said posts.

13. A structure according to claim 12 wherein a support is provided between said first mentioned lazy tong members and said load supporting members are partially supported on said support.

14. In a lazy tong structure:
   a plurality of serially connected lazy tong units,
   each of said units comprising a pair of laterally spaced vertically disposed lazy tong members with each of said members including a pair of links pivotally connected by an intermediate pivot at a point intermediate ends thereof, the upper ends of said links being pivotally connected to form a horizontally extending row of upper pivots and the lower ends of said links being pivotally connected to form a horizontally extending row of lower pivots,
   a plurality of load supporting members swingably connected at one of their ends to said intermediate pivots with pairs of said members being interconnected for relative movement at their other ends,
   said load supporting members extending between said laterally spaced lazy tong members and cooperating to form a substantially planar horizontally disposed load carrying deck when said structure is extended.

15. A structure according to claim 14 wherein a floating support is carried by each lazy tong unit for supporting said members adjacent said other ends.

16. A structure according to claim 15 wherein an auxiliary lazy tong stiffening mechanism is connected to said lower pivots and said mechanism is operatively associated with said floating support when said structure moves toward retracted position for swinging said members upwardly at said ends.

17. A circular member adapted for use as a reel or the like comprising:
   a plurality of radially extending ribs disposed about a center, connecting means between each adjacent pair of ribs, each of said connecting means including a pair of links disposed in side by side intersecting relation and connected at their ends to a pair of adjacent ribs, the connection of one of the corresponding ends of said links being a pivot and the connection of the other corresponding ends being a pivoted sliding connection to permit radial movement of said other ends, whereby said ribs may be collapsed to a position in side by side relationship by swinging the same about said center.

18. A circular member according to claim 17 wherein means is provided for releasably securing said connecting means of said ribs together.

19. A circular member according to claim 17 wherein a plate is provided with apertures adapted to receive therethrough the pivots of said other of the corresponding ends of said links for releasably securing said pivots together when said member is in its extended circular condition.

20. A member according to claim 19 wherein said plate is swingably secured to one of said ribs.

References Cited

UNITED STATES PATENTS

| | | | |
|---|---|---|---|
| 418,827 | 1/1890 | St. Marie | 52—109 |
| 1,756,220 | 4/1930 | Stackpole | 248—277 |
| 1,766,901 | 6/1930 | Gustavson | 248—277 |
| 2,674,252 | 4/1954 | Finlayson et al. | 134—4 |
| 2,767,812 | 10/1956 | Boger | 52—109 XR |
| 3,034,765 | 5/1962 | Ludowici | 182—63 XR |
| 3,053,351 | 9/1962 | Fulcher | 52—109 |
| 3,152,347 | 10/1964 | Williams | 52—109 |

HENRY C. SUTHERLAND, *Primary Examiner.*

P. C. FAW, *Assistant Examiner.*